US012619660B2

(12) United States Patent
Bariki et al.

(10) Patent No.: US 12,619,660 B2
(45) **Date of Patent: *May 5, 2026**

(54) PERFORMING A SEMANTIC SEARCH ON A DIGITAL MEDIA DATABASE

(71) Applicant: DISH Network Technologies India Private Limited, Bangalore (IN)

(72) Inventors: Harshith Bariki, Bangalore (IN); Hardik Radia, Gujarat (IN); Latchmana Kumar M R, Tamilnadu (IN); Raghavendra Somanath, Hyderabad (IN)

(73) Assignee: DISH Network Technologies India Private Limited, Bangalore (IN)

( * ) Notice: Subject to any disclaimer, the term of this patent is extended or adjusted under 35 U.S.C. 154(b) by 34 days.

This patent is subject to a terminal disclaimer.

(21) Appl. No.: 18/401,270

(22) Filed: Dec. 29, 2023

(65) Prior Publication Data

US 2025/0217417 A1     Jul. 3, 2025

(51) Int. Cl.
*G06F 16/78*          (2019.01)
*G06F 16/783*         (2019.01)
*G06F 40/40*          (2020.01)

(52) U.S. Cl.
CPC ...... *G06F 16/7867* (2019.01); *G06F 16/7834* (2019.01); *G06F 16/7844* (2019.01); *G06F 40/40* (2020.01)

(58) Field of Classification Search
None
See application file for complete search history.

(56) References Cited

U.S. PATENT DOCUMENTS

| | | | | |
|---|---|---|---|---|
| 8,782,721 B1 * | 7/2014 | Kellicker | ....... | H04N 21/234336 |
| | | | | 725/91 |
| 8,869,207 B1 * | 10/2014 | Earle | ................ | H04N 21/25891 |
| | | | | 725/38 |
| 12,411,827 B2 * | 9/2025 | Bariki | ............... | G06F 16/24578 |
| 12,425,694 B2 * | 9/2025 | Bariki | ............... | H04N 21/4828 |
| 2022/0253435 A1 * | 8/2022 | Chen | ......................... | G06N 3/08 |

OTHER PUBLICATIONS

Maaz et al., "Video-ChatGPT: Towards Detailed Video Understanding via Large Vision and Language Models", 2023, arVix (Year: 2023).*

* cited by examiner

*Primary Examiner* — Amresh Singh
(74) *Attorney, Agent, or Firm* — Perkins Coie LLP

(57)          ABSTRACT

The system obtains, from a database, multiple videos and multiple metadata corresponding to the multiple videos. The metadata includes tags generated by a large language model to describe a video. The system converts the metadata into a first vector in a multidimensional space. The first vector encodes information included in the tags as a numerical representation in the multidimensional space. A distance between the first vector and a second vector indicates similarity between the metadata represented by the first vector and a second metadata represented by the second vector. The system obtains a natural language query (NLQ) associated with the database, and converts the NLQ into a third vector in the multidimensional space. The system determines whether the first vector satisfies a distance threshold to the third vector. Upon determining that the first vector satisfies the distance threshold, the system presents the video as a result to the NLQ.

20 Claims, 12 Drawing Sheets

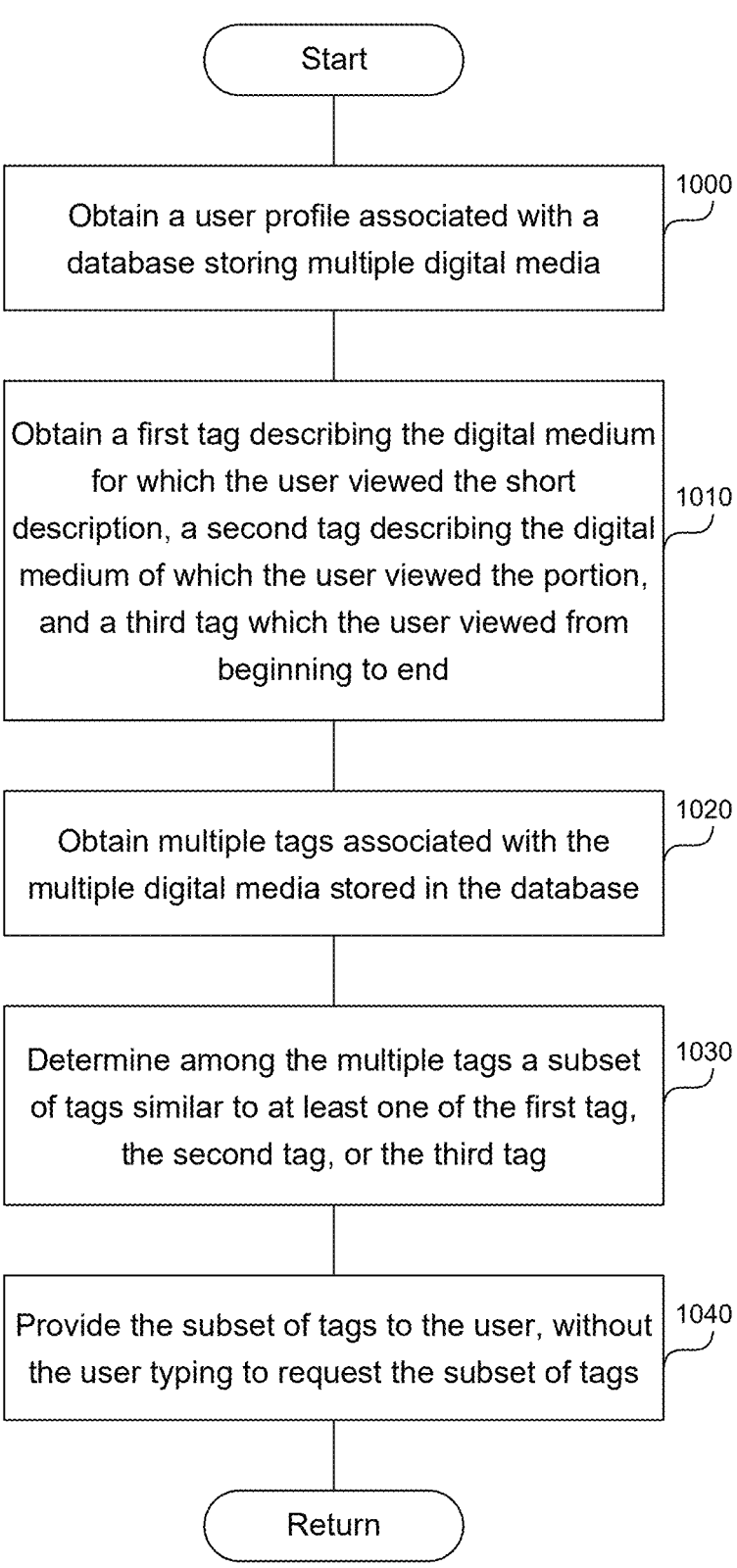

Start

Obtain a user profile associated with a database storing multiple digital media    1000

Obtain a first tag describing the digital medium for which the user viewed the short description, a second tag describing the digital medium of which the user viewed the portion, and a third tag which the user viewed from beginning to end    1010

Obtain multiple tags associated with the multiple digital media stored in the database    1020

Determine among the multiple tags a subset of tags similar to at least one of the first tag, the second tag, or the third tag    1030

Provide the subset of tags to the user, without the user typing to request the subset of tags    1040

Return

*FIG. 10*

PERFORMING A SEMANTIC SEARCH ON A DIGITAL MEDIA DATABASE

BACKGROUND

Third-party providers, such as Gracenote, provide software and metadata to businesses which enable their users to manage and search digital media. Service providers, such as video streaming providers, can enable users to search the digital media, such as video, using the metadata provided by the third-party provider. However, the metadata provided by the third-party provider can be limited, and may not encompass every aspect of the digital media.

BRIEF DESCRIPTION OF THE DRAWINGS

Detailed descriptions of implementations of the present invention will be described and explained through the use of the accompanying drawings.

FIG. 10 is a flowchart of a method to proactively suggest videos to a user.

Figure 1:
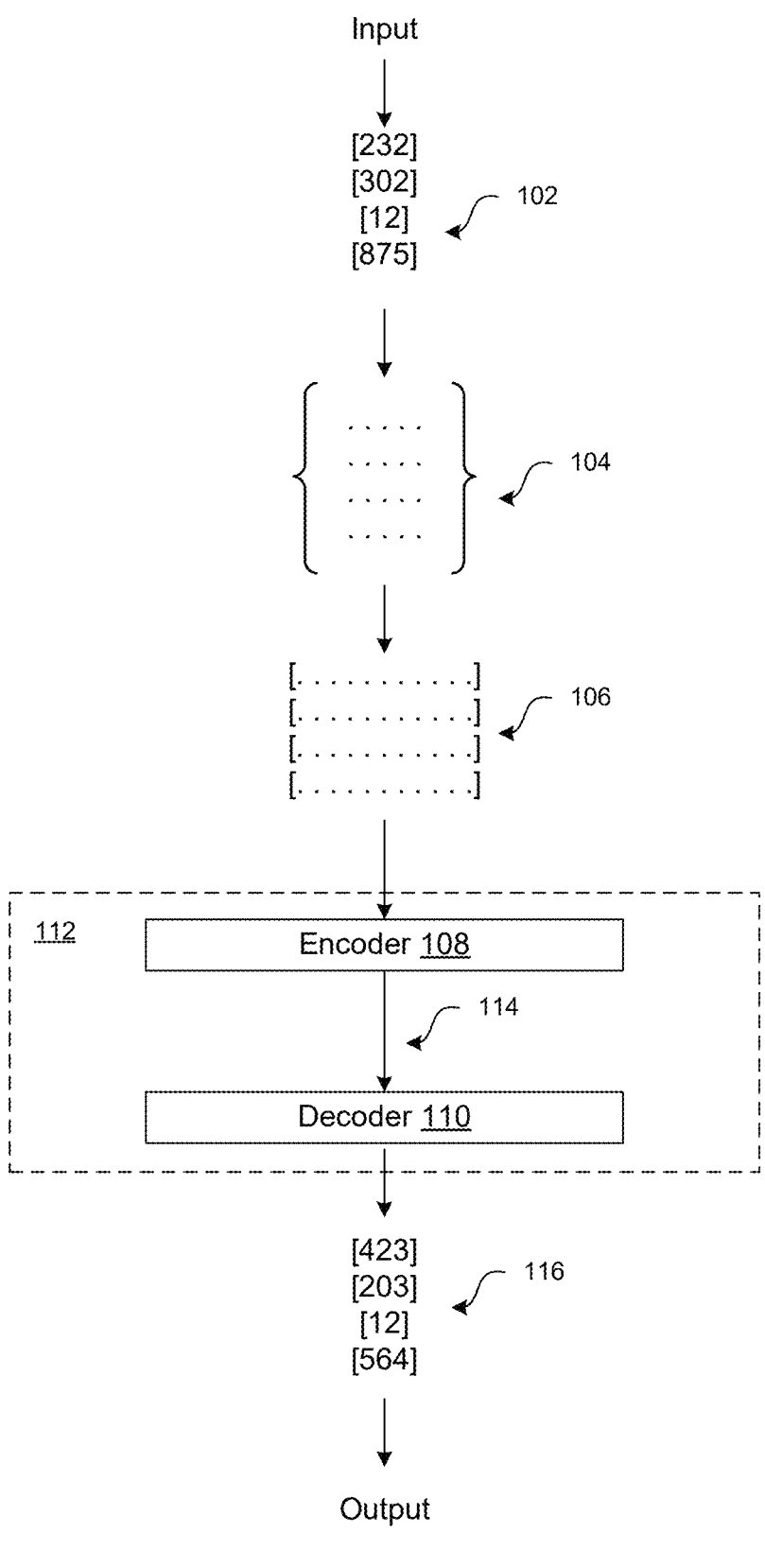
FIG. 1 is a block diagram of an example transformer.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable a more accurate search of a video, e.g., movie, database. The system obtains, from a database storing multiple videos, a video including metadata associated with the video, where the metadata includes a title associated with the video, and where the database storing multiple videos is configured to support a traditional search using the metadata. The traditional search can be a text search looking for matching strings. The system extracts, from the video, an audio and a closed caption data, and provides the audio, the closed caption data, the title associated with the video, and a prompt to a large language model. The prompt requests from the large language model multiple tags based on the audio, the closed caption data, and the title associated with the video. A tag among the multiple tags includes a natural language text indicating a property associated with the video.

The system stores the multiple tags in the database by adding the multiple tags to the metadata associated with the video to obtain new metadata. The system enables a more accurate search of the multiple videos stored in the database by searching the new metadata, which more accurately describes the video.

Additionally, disclosed here is a system to perform a semantic search on a video, e.g., movie, database. The system obtains, from the database, multiple videos and multiple metadata associated with the multiple videos, where a video includes a metadata, and where the metadata includes multiple tags generated by a large language model to describe the video. The system performs the following step for each video among the multiple videos to obtain multiple multidimensional vectors. Specifically, the system converts the metadata into a single multidimensional vector in a multidimensional space, where the single multidimensional vector encodes information included in the multiple tags as a numerical representation in the multidimensional space. A distance between the single multidimensional vector and a multidimensional vector A in the multidimensional space indicates similarity between the metadata associated with the single multidimensional vector and a metadata represented by the multidimensional vector A. For example, a distance of zero indicates identity, while increasing distance indicates increasing dissimilarity.

The system stores the single multidimensional vector in the database, where the single multidimensional vector corresponds to a single video stored in the database. The system obtains a natural language query associated with the database, and converts the natural language query into a multidimensional vector B in the multidimensional space. The system determines among the multiple multidimensional vectors a subset of multidimensional vectors satisfying a distance threshold to the multidimensional vector B. The distance threshold can include a predetermined distance, or the top 10 closest vectors. The subset of multidimensional vectors corresponds to a subset of videos among the multiple videos. The system presents the subset of videos as a result to the natural language query.

Finally, disclosed here is a system to proactively suggest videos, e.g., movies, and to automatically generate a ribbon indicating the digital medium of interest to a user. The system obtains a user profile associated with a database storing multiple videos, where the user profile includes an indication of a video for which a user viewed a short description, a video of which the user consumed a portion, and a video which the user viewed from beginning to end. The system obtains a tag A describing the video for which the user viewed the short description, a tag B describing the video of which the user consumed a portion, and a tag C describing the video which the user viewed from beginning to end.

The system obtains multiple tags associated with the multiple videos stored in the database. The system determines among the multiple tags a subset of tags similar to at least one of tag A, tag B, or tag C by performing the following steps. First, the system uses an artificial intelligence to convert tag A, tag B, and tag C into a vector A in a multidimensional space, a vector B in the multidimensional space, and a vector C in the multidimensional space, respectively. Second, the system uses the artificial intelligence to convert the multiple tags into multiple vectors in the multidimensional space. Third, the system determines multiple distances between the multiple vectors and vector A, vector B, and vector C. Fourth, the system determines among the multiple distances a subset of distances satisfying a distance threshold. Based on the subset of distances, the system obtains the subset of tags similar to at least one of tag A, tag B, or tag C, where a tag among the subset of tags corresponds to a distance among the subset of distances. The system provides the subset of tags to the user, without the user typing to request the subset of tags. By selecting one of the provided tags, the user can, with a single click, search the database for movies related to the selected tag.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Large Language Model

FIG. 1 is a block diagram of an example transformer 112. A transformer is a type of neural network architecture, e.g., a large language model, that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 112 includes an encoder 108 (which can comprise one or more encoder layers/blocks connected in series) and a decoder 110 (which can comprise one or more decoder layers/blocks connected in series). Generally, the encoder 108 and the decoder 110 each include a plurality of neural network layers, at least one of which can be a self-attention layer. The parameters of the neural network layers can be referred to as the parameters of the language model.

The transformer 112 can be trained to perform certain functions on a natural language input. For example, the functions include summarizing existing content, brainstorming ideas, writing a rough draft, fixing spelling and grammar, and translating content. Summarizing can include extracting key points from an existing document. Brainstorming ideas can include generating a list of ideas based on provided input. For example, the ML model can generate a list of names for a startup, or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 112 is trained to perform certain functions on input formats other than natural language input. For example, the input can include objects, images, audio content, or video content, or a combination thereof.

The transformer 112 can be trained on a text corpus that is labeled (e.g., annotated to indicate verbs, nouns, etc.) or unlabeled. Large language models can be trained on a large unlabeled corpus. Some large language models can be trained on a large multi-language, multi-domain corpus, to enable the model to be versatile at a variety of language-based tasks such as generative tasks (e.g., generating human-like natural language responses to natural language input). FIG. 1 illustrates an example of how the transformer 112 can process textual input data. Input to a language model (whether transformer-based or otherwise) typically is in the form of natural language as can be parsed into tokens. It should be appreciated that the term "token" in the context of language models and natural language processing (NLP) has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted into numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without whitespace appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph, etc.), an [EOT] token can be another special token that indicates the end of the textual sequence, other tokens can provide formatting information, etc.

In FIG. 1, a short sequence of tokens 102 corresponding to the input text is illustrated as input to the transformer 112. Tokenization of the text sequence into the tokens 102 can be performed by some pre-processing tokenization module such as, for example, a byte pair encoding tokenizer (the "pre" referring to the tokenization occurring prior to the processing of the tokenized input by the large language model), which is not shown in FIG. 1 for simplicity. In general, the token sequence that is inputted to the transformer 112 can be of any length up to a maximum length defined based on the dimensions of the transformer 112. Each token 102 in the token sequence is converted into an embedding vector 106 (also referred to simply as an embedding). An embedding 106 is a learned numerical representation (such as, for example, a vector) of a token that captures some semantic meaning of the text segment represented by the token 102. The embedding 106 represents the text segment corresponding to the token 102 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 106 corresponding to the "write" token will be closer to another embedding corresponding to the "jot down" token in the vector space, as compared to the distance between the embedding 106 corresponding to the "write" token and another embedding corresponding to the "summary" token.

The vector space can be defined by the dimensions and values of the embedding vectors. Various techniques can be used to convert a token 102 into an embedding 106. For example, another trained ML model can be used to convert the token 102 into an embedding 106. In particular, another trained ML model can be used to convert the token 102 into an embedding 106 in a way that encodes additional information into the embedding 106 (e.g., a trained ML model can encode positional information about the position of the token 102 in the text sequence into the embedding 106). In some examples, the numerical value of the token 102 can be used to look up the corresponding embedding in an embedding matrix 104 (which can be learned during training of the transformer 112).

The generated embeddings 106 are input into the encoder 108. The encoder 108 serves to encode the embeddings 106 into feature vectors 114 that represent the latent features of the embeddings 106. The encoder 108 can encode positional information (i.e., information about the sequence of the input) into the feature vectors 114. The feature vectors 114 can have very high dimensionality (e.g., on the order of thousands or tens of thousands), with each element in a feature vector 114 corresponding to a respective feature. The numerical weight of each element in a feature vector 114 represents the importance of the corresponding feature. The space of all possible feature vectors 114 that can be generated by the encoder 108 can be referred to as the latent space or feature space.

Conceptually, the decoder 110 is designed to map the features represented by the feature vectors 114 into meaningful output, which can depend on the task that was assigned to the transformer 112. For example, if the transformer 112 is used for a translation task, the decoder 110 can map the feature vectors 114 into text output in a target language different from the language of the original tokens 102. Generally, in a generative language model, the decoder 110 serves to decode the feature vectors 114 into a sequence of tokens. The decoder 110 can generate output tokens 116 one by one. Each output token 116 can be fed back as input to the decoder 110 in order to generate the next output token 116. By feeding back the generated output and applying self-attention, the decoder 110 is able to generate a sequence of output tokens 116 that has sequential meaning (e.g., the resulting output text sequence is understandable as a sentence and obeys grammatical rules). The decoder 110 can generate output tokens 116 until a special [EOT] token (indicating the end of the text) is generated. The resulting sequence of output tokens 116 can then be converted into a text sequence in post-processing. For example, each output token 116 can be an integer number that corresponds to a vocabulary index. By looking up the text segment using the vocabulary index, the text segment corresponding to each output token 116 can be retrieved, the text segments can be concatenated together, and the final output text sequence can be obtained.

In some examples, the input provided to the transformer 112 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to a question, text associated with a request, or a list of ideas associated with a request. For example, the input can include the question "What is the weather like in Australia?" and the output can include a description of the weather in Australia. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and Generative Pre-trained Transformers (GPT)-type models can be language models that are considered to be decoder-only language models.

Because GPT-type language models tend to have a large number of parameters, these language models can be considered large language models. An example of a GPT-type large language model is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type large language model and has been fine-tuned with training datasets based on text-based chats (e.g., chatbot conversations). ChatGPT is designed for processing natural language, receiving chat-like inputs, and generating chat-like outputs.

A computing system can access a remote language model (e.g., a cloud-based language model), such as ChatGPT or GPT-3, via a software interface (e.g., an application programming interface (API)). Additionally or alternatively, such a remote language model can be accessed via a network such as, for example, the Internet. In some implementations such as, for example, potentially in the case of a cloud-based language model, a remote language model can be hosted by a computer system and can include a plurality of cooperating (e.g., cooperating via a network) computer systems such as can be in, for example, a distributed arrangement. Notably, a remote language model can employ a plurality of processors (e.g., hardware processors such as, for example, processors of cooperating computer systems). Indeed, processing of inputs by a large language model can be computationally expensive/can involve a large number of operations (e.g., many instructions can be executed/large data structures can be accessed from memory) and providing output in a required timeframe (e.g., real time or near real time) can require the use of a plurality of processors/cooperating computing devices as discussed above.

An input to a large language model can be referred to as a prompt, which is a natural language input that includes instructions to the large language model to generate a desired output. A computing system can generate a prompt that is provided as input to the large language model via its API. As described above, the prompt can optionally be processed or pre-processed into a token sequence prior to being provided as input to the large language model via its API. A prompt can include one or more examples of the desired output, which provides the large language model with additional information to enable the large language model to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Enabling a More Accurate Search of a Digital Media Database

Figure 2:
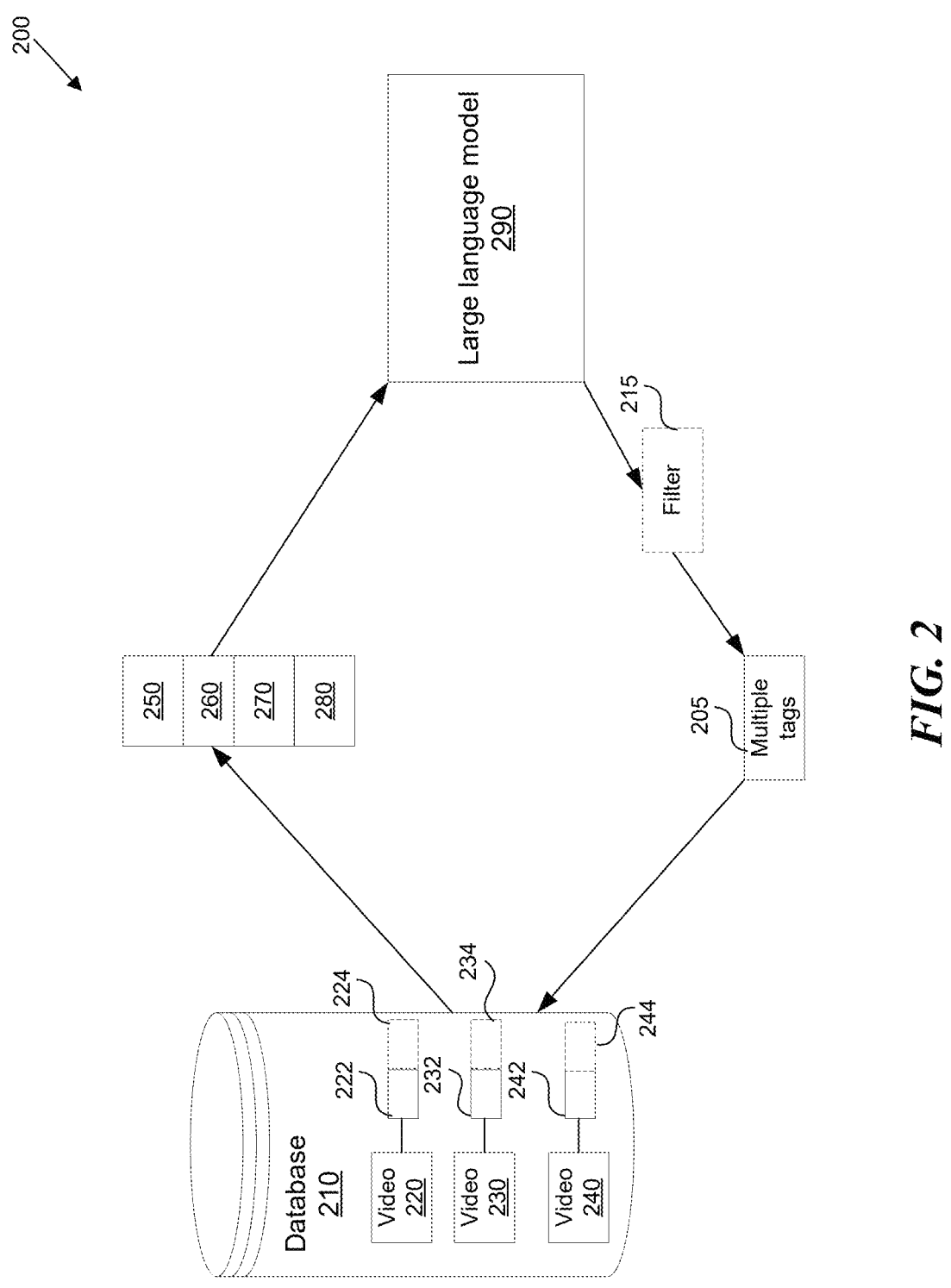
FIG. 2 shows a system to enable a more accurate search of a digital media database.

FIG. 2 shows a system to enable a more accurate search of a digital media database. The system 200 includes a database 210 storing a digital medium 220, 230, 240, such as video and/or audio. The video 220, 230, 240 can come from live television, a streaming digital medium, a transactional digital medium on demand, and a subscription digital medium on demand.

The video 220, 230, 240 can be provided by a third party, such as a movie or a videogame studio like Disney, Sony Pictures Imageworks, Nintendo, etc. The video 220, 230, 240 can include tags 222, 232, 242 provided by the third party classifying the videos into predetermined categories by title or genre. The system 200 can use the provided tags 222, 232, 242 to filter and search the video 220, 230, 240. However, searching by title or genre is limited, and, in addition, the tags 222, 232, 242 provided by the third party may not capture every aspect of the video 220, 230, 240.

For example, Nintendo can classify "Super Mario" as a comedy movie, and add a genre tag that says "comedy." Consequently, if the user searches for a "fantasy world," the system 200 does not recover "Super Mario" as a result.

To improve the search, the system 200 can extract, from the video 220, 230, 240, an audio 250 and a closed caption data 260. The system 200 can provide additional data including the audio 250, the closed caption data 260, and a title 270 associated with the video and a prompt 280 to an artificial intelligence 290, such as a large language model. The prompt 280 can request multiple tags 205 based on the audio 250, the closed caption data 260, and the title 270 associated with the video 220, 230, 240. In some embodiments, the system 200 can provide a social media tag associated with the video to the large language model 290.

The large language model 290 can analyze the additional data including the audio 250, the closed caption data 260, and the title 270 to generate new tags 224, 234, 244. The system 200 can add the new tags 224, 234, 244 to the database 210.

The new tags 224, 234, 244 can include additional natural language phrases describing the content of the video 220, 230, 240 identifying actors in the movie, identifying music in the movie, identifying the director of the movie, identifying the screenwriter, etc. For example, for the movie "Super Mario" the additional tags can include "fantasy world" or "mushroom," while for the movie "John Wick" the additional tags can include "assassin." With the additional tags, when the user requests video 220, 230, 240 including "fantasy world," the system 200 can provide "Super Mario" as a result of the search. Similarly, if the user requests an "assassin" movie, the system can provide "John Wick" as a result, even though "assassin" is not part of the originally provided tags 222, 232, 242.

In addition, the system 200 can use a filter 215 to reduce the number of new tags 224, 234, 244 generated by the large language model 290. The filter 215 can be a relevance filter, selecting tags 224, 234, 244 to add to the database 210 based on the relevance. For example, the relevance can be based on what the users of the system 200 tend to watch.

Figure 3:
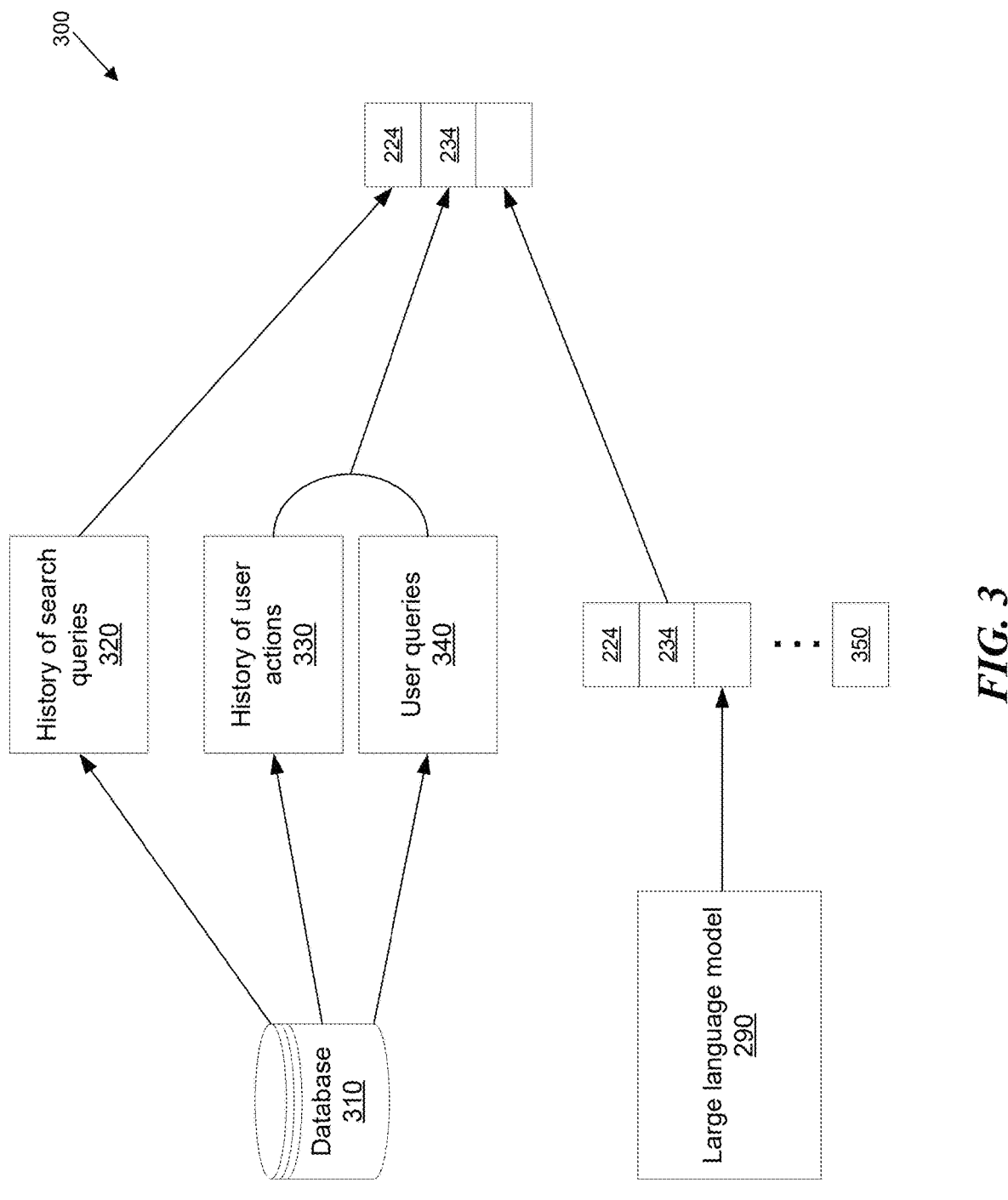
FIG. 3 shows filtering of tags generated by a large language model.

FIG. 3 shows filtering of tags 224, 234, 350 generated by the large language model 290. The large language model 290 can generate many tags 224, 234, 350 (only three labeled for brevity), some of which may be irrelevant to the users of the system 300, 200 in FIG. 2, and can consume storage space in the database 210 in FIG. 2, thus slowing down the search of the relevant videos. Consequently, the system 300 can filter the tags 224, 234, 350 based on relevance.

In one embodiment, to determine relevance, the system 300 can obtain from the database 310 a history of search queries 320 input by various users of the system 200, 300. The system 300 can be a component of the system 200. The history of search queries 320 can include natural language input by the users identifying keywords to look for in tags 224, 234, 350. For example, the history of search queries 320 can contain a query stating "romantic comedy." The system 300 can consequently determine that the tag 224 including the words "romantic comedy" is relevant. For example, to determine relevance, the system 300 can rank the multiple tags 224, 234, 350. Based on the ranking, the system 300 can select the top predetermined number of tags, such as the top 10 tags or the top 20% of tags, and store those tags 224, 234 in the database 210 in FIG. 2.

In another embodiment, to determine relevance, the system 300 can obtain from the database 310 a history of user actions 330 performed after a search result was provided to the user. The user actions can include consuming at least a part of the video 220, 230, 240. The system 300 can obtain the user queries 340 which resulted in the consumption of the video 220, 230, 240. Consequently, the system can determine that the users are interested in tags corresponding to the words contained in the user queries 340. Tags corresponding to words contained in the user queries can include identical words and synonyms. As a result, the system 300 can rank the multiple tags 224, 234, 350 based on how frequently they occur in the user queries 340. Based on the ranking, the system 300 can select the top predetermined number of tags, such as the top 10 tags or the top 20% of tags, and store those tags 224, 234 in the database 210 in FIG. 2.

Figure 4:
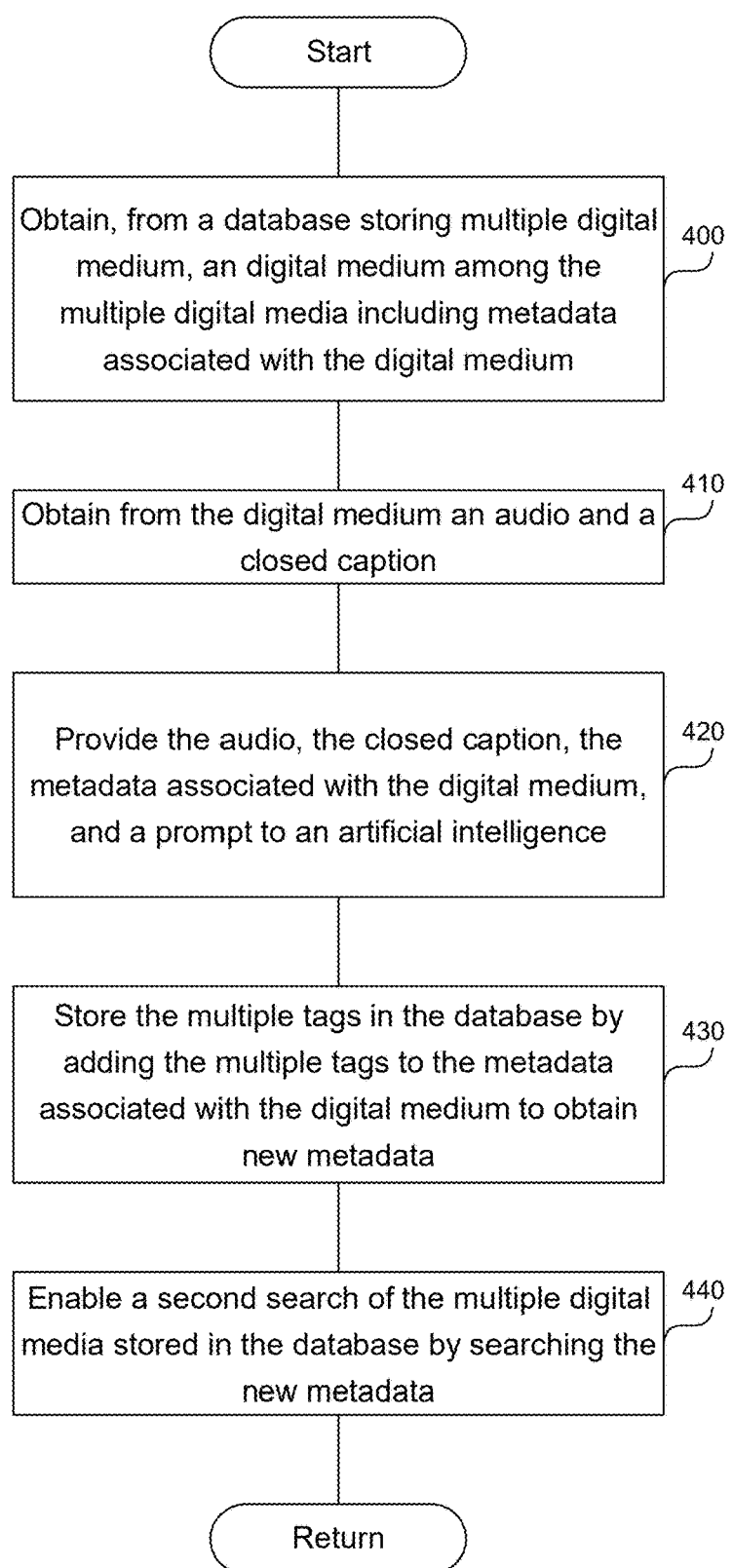
FIG. 4 is a flowchart of a method to enable a more accurate search of a digital media database.

FIG. 4 is a flowchart of a method to enable a more accurate search of a digital media database. A hardware or software processor executing instructions described in this application can, in step 400, obtain, from a database storing multiple digital media, a digital medium among the multiple digital media including metadata associated with the digital medium. The digital medium can be a movie or a videogame many hours in length. The database storing multiple digital media is configured to support a first search using the metadata, which can include a title or genre associated with the digital medium. For example, when the digital medium is video, the database can store video data that describes the video or indicates the memory location of the video. Video data can include video itself.

In step 410, the processor can obtain from the digital medium an audio and a closed caption data.

In step 420, the processor can provide the audio, the closed caption data, the metadata associated with the digital medium, and a prompt to an artificial intelligence. The prompt can request multiple tags based on the audio, the closed caption data, and the title associated with the digital medium. A tag among the multiple tags can indicate a property associated with the digital medium. The tag can be natural language text, such as a word or phrase.

In step 430, the processor can store the multiple tags in the database by adding the multiple tags to the metadata associated with the digital medium to obtain new metadata.

In step 440, the processor can enable a second search of the multiple digital media stored in the database by searching the new metadata. The second search can provide more accurate results than the first search.

The processor can receive a natural language query from a user describing a desired digital medium. The processor can search the new metadata based on the natural language query to obtain multiple results. The processor can sort the multiple results based on a match between the natural language query and the new metadata to obtain sorted results. The processor can present the sorted results to the user.

The processor can obtain a history of search results including the digital medium. The processor can obtain a history of search queries corresponding to the history of search results. The processor can determine a similarity between the history of search queries and the multiple tags based on string similarity between the history of search queries and each tag. The measure of similarity can take synonyms into account. The processor can rank the multiple tags based on the similarity to obtain a ranking. For example, the multiple tags that are similar to more of the search queries in the history of search queries get higher ranking, while the tags that have less similarity with the history of search queries get lower ranking. For example, if the word "horror" appears 10 times in the history of search rankings, the tag "scary" can receive a similarity score of 10, while the tag "romcom" will receive a score of 0. Consequently, the tag "horror" is ranked higher than the tag "romcom." The processor can discard a predetermined amount of lower-ranked tags from the ranking to obtain a subset of the multiple tags. The predetermined number can include the bottom 50%. The processor can store the subset of the multiple tags in the database by adding the multiple tags to the metadata associated with the digital medium to obtain the new metadata.

The processor can obtain a history of user actions performed after a search result was provided to the user, where the search result included the digital medium, and where each user action in the history of user actions indicated a user interest in the digital medium, such as looking at the detailed description of the digital medium, or consuming at least a part of the digital medium. The processor can obtain a history of search queries corresponding to the history of user actions. The processor can determine a similarity between the history of search queries and the multiple tags. The processor can rank the multiple tags based on the similarity to obtain a ranking. The processor can discard lower-ranked tags from the ranking to obtain a subset of the multiple tags. The processor can store the subset of the multiple tags in the database by adding the multiple tags to the metadata associated with the digital medium to obtain the new metadata.

The processor can augment the tags with social media tags. Specifically, the processor can obtain a social media tag associated with the digital medium. The processor can provide the multiple social media tags, the audio, the closed caption data, the title associated with the digital medium, and the prompt to an artificial intelligence to obtain the multiple tags.

The processor can obtain, from the database storing the multiple digital media, the metadata associated with the digital medium. The metadata can include at least two of: a title associated with the digital medium, a subtitle associated with the digital medium, a description associated with the digital medium, a genre associated with the digital medium, or a performer associated with the digital medium. The processor can provide the multiple social media tags, the audio, the closed caption data, the metadata, and the prompt to an artificial intelligence to obtain the multiple tags.

Performing a Semantic Search on a Digital Media Database

Figure 5:
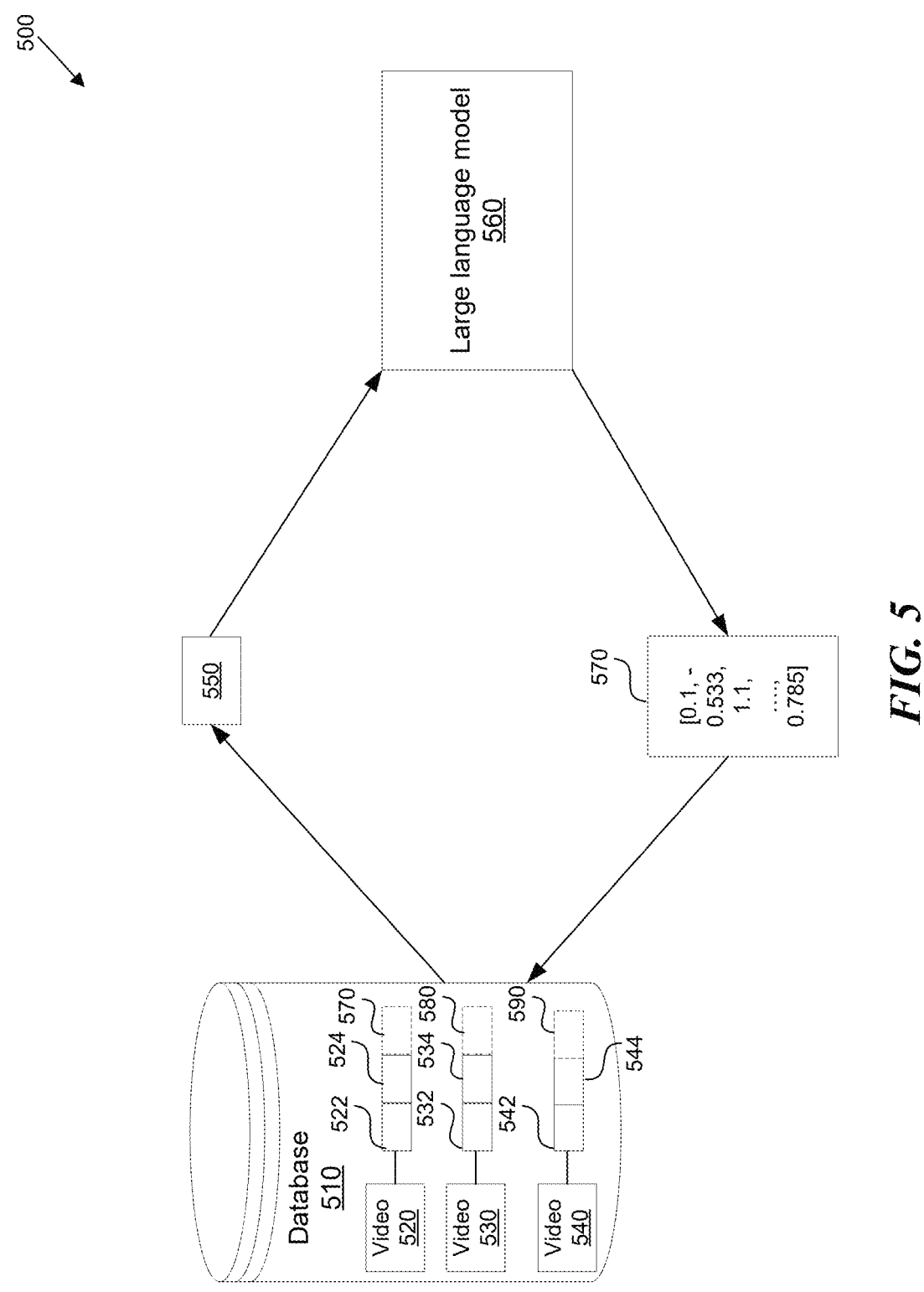
FIG. 5 shows a system to perform a semantic search on a digital media database.

FIG. 5 shows a system to perform a semantic search on a digital media database. The system 500 includes a database 510 storing a digital medium, such as video, 520, 530, 540. The video 520, 530, 540 can come from live television, a streaming digital medium, a transactional digital medium on demand, and a subscription digital medium on demand.

The video 520, 530, 540 can be provided by a third party, such as a movie or a videogame studio like Disney, Sony Pictures Imageworks, Nintendo, etc. The database 510 can store metadata, e.g., tags 522, 532, 542, provided by the third party classifying the videos into predetermined categories by title or genre. The tags 522, 532, 542 can provide high-level description of the video 520, 530, 540, such as title, summary, director, and/or genre. In addition, the database 510 can also store additional metadata, e.g., tags 524, 534, 544, generated by the large language model 290 in FIG. 2. The tags 524, 534, 544 can provide additional description of the video 520, 530, 540 that is missing from tags 522, 532, 542.

The system 500 can gather the tags 522, 532, 542, 524, 534, 544 and provide the tags as input 550 to an artificial intelligence, e.g., a large language model, 560. In addition, the system 500 can provide the video 520, 530, 540 itself, the audio from the video, and/or a transcript of the audio as the input 550 to the large language model 560.

Based on the input 550, the large language model 560 can generate a single multidimensional vector 570 representing the content of the video 520, 530, 540. By generating the single multidimensional vector 570 based on all the input 550 associated with the video 520, 530, 540, as opposed to generating multiple vectors, the information associated with the whole video is represented by the single multidimensional vector. Consequently, the number of dimensions of the multidimensional vector 570 is higher than the number of dimensions required to represent a vector associated with just the single tag. For example, if the system 500 were to generate a multidimensional vector for each tag 522, 532, 542, 524, 534, 544, each vector would represent a single concept such as Mario, videogame, fantasy, children, etc. No single vector would represent all these concepts together. By representing all the tags in a single multidimensional vector 570, that single vector can represent the "Super Mario" movie as a videogame character in a fantasy world suitable for children.

The system 500 generates one multidimensional vector 570, 580, 590 for each video 520, 530, 540, respectively, and stores the multidimensional vectors in the database 510, along with the corresponding video.

Figure 6:
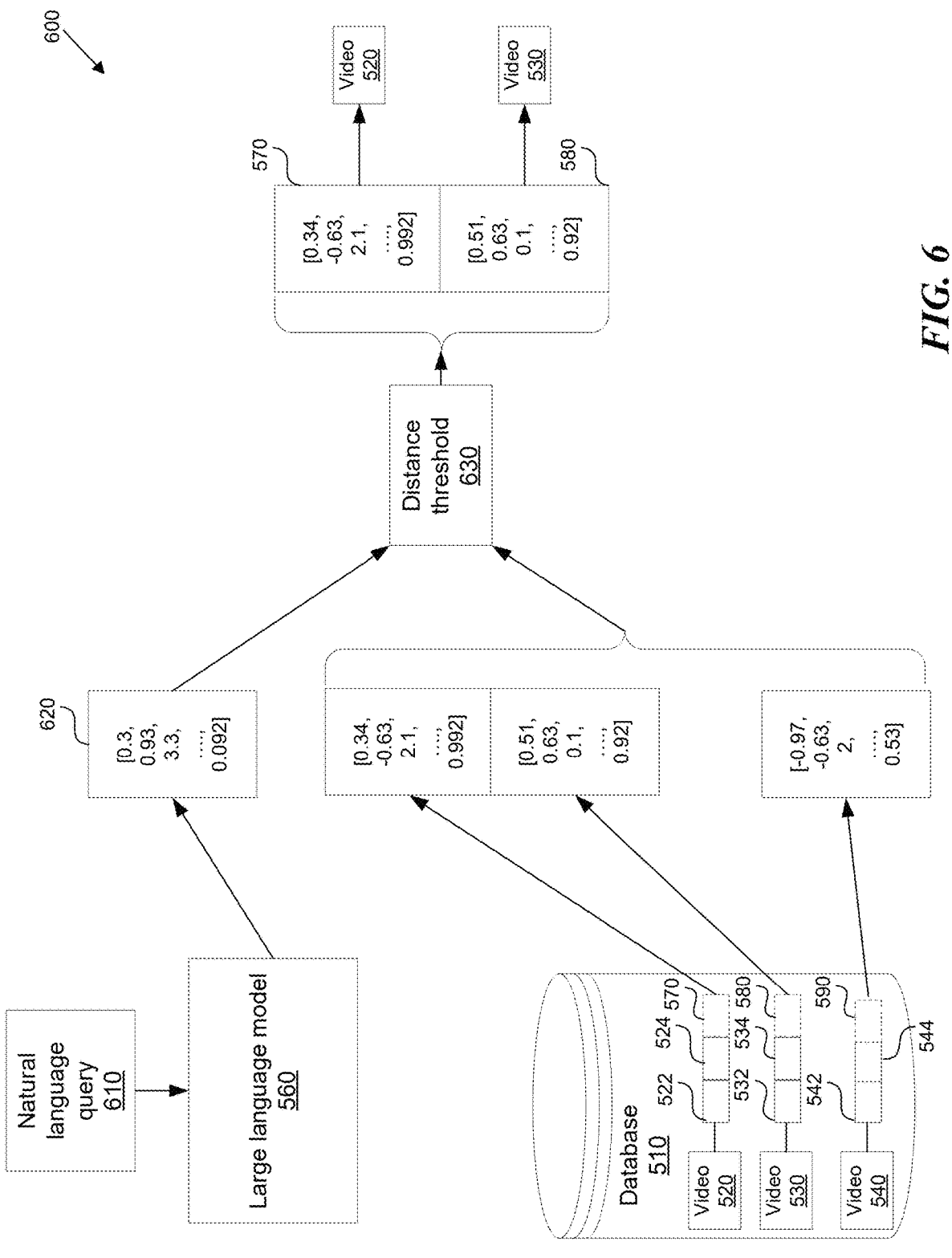
FIG. 6 shows a system to answer a natural language input using multidimensional vectors.

FIG. 6 shows a system to answer a natural language input using multidimensional vectors. The system 600 can be a component of the system 500 in FIG. 5 and can include the large language model 560. The large language model 560 can receive a natural language query 610 regarding the database 510. For example, the query 610 can ask for "vampire movies." The large language model 560 can convert the query 610 into a vector 620 in the same multidimensional space used by the multidimensional vectors 570, 580, 590.

The system 600 can retrieve the multiple multidimensional vectors 570, 580, 590 from the database 510, and can determine which of the multiple multidimensional vectors satisfy a distance threshold 630. The distance threshold 630 can ask for a predetermined number of closest multidimensional vectors 570, 580, 590, such as the top 10 closest vectors or the top 5% of closest vectors to the vector 620. Alternatively, the distance threshold 630 can ask for all the vectors within a predetermined distance such as three units away from the vector 620 representing the query 610 to the vector 620.

The system 600 can select the multidimensional vectors 570, 580 satisfying the distance threshold 630, and based on the multidimensional vectors 570, 580, the system can present the videos 520, 530 associated with the selected vectors.

To measure the distance, the system 600 can use cosine similarity. Cosine similarity is the cosine of the angle between the vectors; that is, it is the dot product of the vectors divided by the product of their lengths. It follows that the cosine similarity does not depend on the magnitudes of the vectors, but only on their angle.

By performing the search in the multidimensional space using the distance threshold 630, the system 600 effectively performs a semantic search. Using the semantic search, the system 600 can find videos 520, 530, which may not be an identical match to the query 610 but are semantically related to the search query. For example, if the search query is "vampire movies," but none of the tags 522, 532, 542, 524, 534, 544 includes the word "vampire," the system 600 can still find related movies, such as zombie movies, because the distance between the search query "vampire movies" and the vector representing a "zombie movie" is small and satisfies the distance threshold 630.

Figure 7:
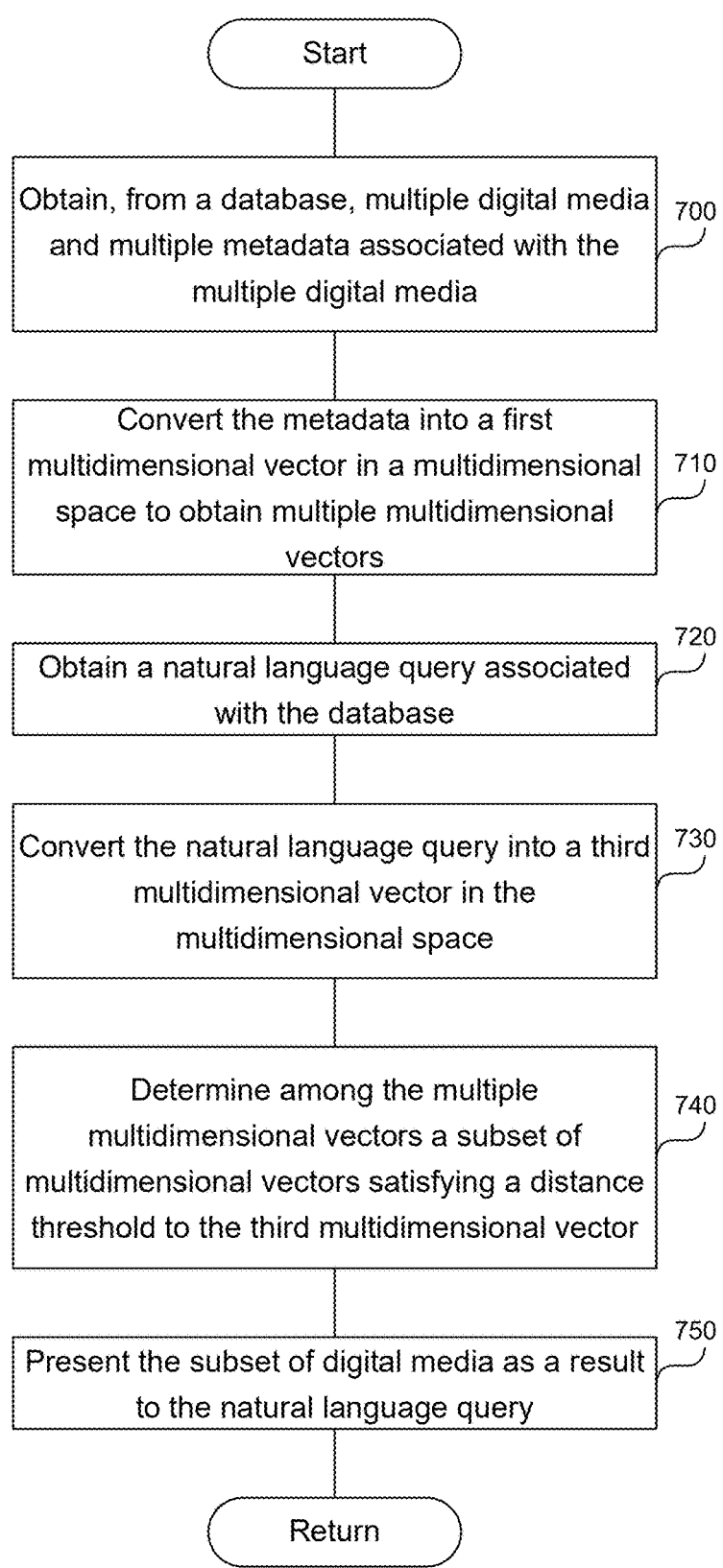
FIG. 7 is a flowchart of a method to perform a semantic search on a digital media database.

FIG. 7 is a flowchart of a method to perform a semantic search on a digital media database. A hardware or software processor executing instructions described in this application can, in step 700, obtain, from a database, multiple digital media and multiple metadata associated with the multiple digital media, where a digital medium among the multiple digital media includes a metadata among the multiple metadata, and where the metadata among the multiple metadata includes multiple tags generated by a large language model to describe the digital medium. The database can store live television, a streaming digital medium, a transactional digital medium on demand, and a subscription digital medium on demand.

In step 710, the processor can perform the following steps for each digital medium among the multiple digital media to obtain multiple multidimensional vectors. First, the processor can convert the metadata into a single first multidimensional vector in a multidimensional space. The first multidimensional vector encodes information included in the multiple tags as a numerical representation in the multidimensional space. A distance between the first multidimensional vector and a second multidimensional vector in the multidimensional space indicates similarity between the metadata associated with the first multidimensional vector and a second metadata represented by the second multidimensional vector. A distance of zero indicates identity, where increasing distance indicates increasing dissimilarity. Second, the processor can store the first multidimensional vector in the database, where the first multidimensional vector corresponds to one digital medium stored in the database.

In step 720, the processor can obtain a natural language query associated with the database. In step 730, the processor can convert the natural language query into a third multidimensional vector in the multidimensional space.

In step 740, the processor can determine, among the multiple multidimensional vectors, a subset of multidimensional vectors satisfying a distance threshold to the third multidimensional vector. The predetermined distance threshold can include a predetermined distance, the top 20 closest vectors, or the top 1% of closest vectors. The subset of multidimensional vectors corresponds to a subset of digital media among the multiple digital media. In step 750, the processor can present the subset of digital media as a result to the natural language query.

The processor can obtain a user profile associated with a database storing multiple videos, where the user profile includes an indication of a video for which a user viewed a short description, a video of which the user viewed a portion, and a video which the user viewed from beginning to end. The processor can encode the user profile and the natural language query into the third multidimensional vector, thus providing the context for the query. Subsequently, the processor evaluates any similarities between the query and the corresponding videos in the context of the user profile containing the user preferences.

The processor can obtain, from the database storing the multiple digital media, the metadata associated with the digital medium. The metadata can include at least three of: a title associated with the digital medium, a subtitle associated with the digital medium, a description associated with the digital medium, a genre associated with the digital medium, or a performer associated with the digital medium. The processor can extract, from the digital medium, an audio and a closed caption data. The processor can provide the audio, the closed caption data, a prompt, and the metadata to a large language model. The prompt can request multiple tags based on the audio, the closed caption data, and the digital medium. A tag among the multiple tags can include a natural language text indicating a property associated with the digital medium. The processor can store the multiple tags in the database by adding the multiple tags to the metadata associated with the digital medium.

The processor can determine multiple distances between each multidimensional vector among the multiple multidimensional vectors and the third multidimensional vector using a cosine similarity between each multidimensional vector among the multiple multidimensional vectors and the third multidimensional vector. The processor can rank the multiple multidimensional vectors using the multiple distances.

The processor can extract, from the digital medium, an audio and a closed caption data. The processor can provide the audio, the closed caption data, a prompt, and the digital medium to a large language model. A tag among the multiple tags can include a natural language text indicating a property associated with the digital medium. The processor can store the multiple tags in the database by adding the multiple tags to the metadata associated with the digital medium.

The processor can obtain a social media tag associated with the digital medium. The processor can extract, from the digital medium, an audio and a closed caption data. The processor can provide the audio, the closed caption data, the social media tag, and a prompt to a large language model, where the prompt requests multiple tags based on the audio, the closed caption data, and the digital medium, and where a tag among the multiple tags includes a natural language text indicating a property associated with the digital medium. The processor can store the multiple tags in the database by adding the multiple tags to the metadata associated with the digital medium.

Figure 8:
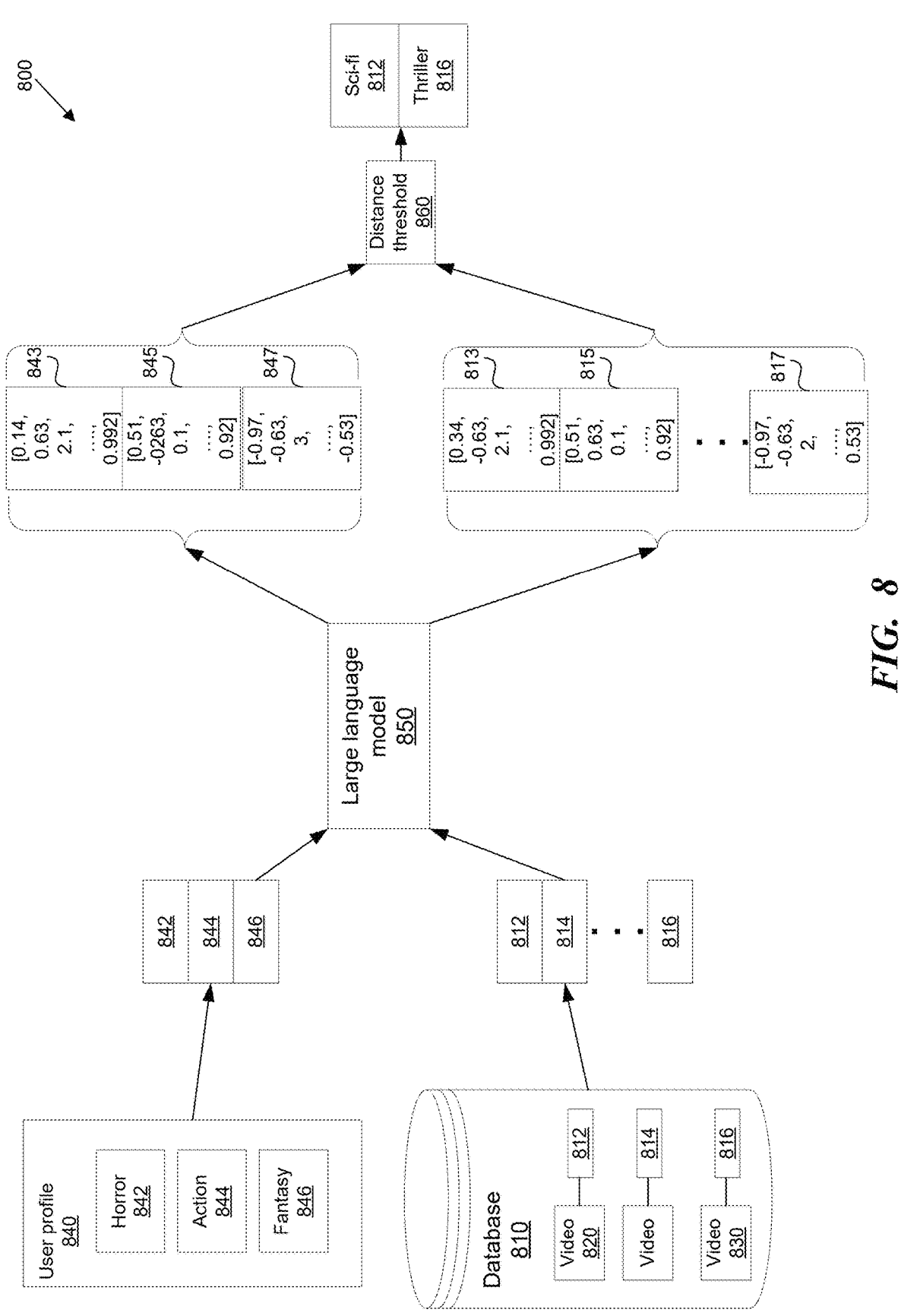
FIG. 8 shows a system to proactively suggest videos to a user.

Proactively Suggesting a Digital Medium and Automatically Generating a Ribbon Indicating the Digital Medium of Interest to a User FIG. 8 shows a system to proactively suggest videos to a user. The system 800 can include a database 810 storing digital media 820, 830 (only two labeled for brevity), e.g., videos, which can come from live television, a streaming digital medium, a transactional digital medium on demand, and a subscription digital medium on demand.

The system 800 can have an interface in which typing is difficult. For example, in Netflix, typing is limited to painstakingly selecting a single key at a time using a remote control. On a mobile device, typing is even more challenging. Consequently, the system 800 can proactively provide relevant tags 812, 816 to the user, which the user can select using a single click, and without typing. The relevant tags 812, 816 can be new tags associated with movies that the user hasn't previously seen, but that would be of interest to the user.

To provide relevant tags 812, 816, the system 800 can store a user profile 840, which can include tags 842, 844, 846. The first tag 842 can describe a video for which the user viewed a short description. The second tag 844 can describe a video of which the user consumed a portion. The third tag 846 can describe a video which the user viewed from beginning to end.

The system 800 can retrieve multiple tags 812, 814, 816 from the database 810, which can be generated as described in this disclosure, and that can describe various aspects of the videos stored in the database 810, such as genre, actors, directors, video content, etc. The system 800 can provide the multiple tags 812, 814, 816 from the database 810 and the tags 842, 844, 846 from the user profile 840 to an artificial intelligence 850, such as a large language model.

The large language model 850 can generate multidimensional vectors 843, 845, 847, 813, 815, 817 corresponding to the tags 842, 844, 846, 812, 814, 816, respectively. The system 800 can determine which multidimensional vectors 813, 815, 817 are similar to the multidimensional vectors 843, 845, 847 representing the user's interests. To determine similarity, the system 800 can compute distance between the multidimensional vectors 813, 815, 817 and the multidimensional vectors 843, 845, 847. The smaller the distance, the more similar the vectors. The system 800 can determine similar vectors based on a distance threshold 860, which can indicate a maximum distance in the multidimensional space, such as three units. The distance threshold 860 can indicate a percentage of closest vectors to include or a number of closest vectors to include in the similar vectors. Upon determining the similar vectors, the system 800 can present to the user the tags 812, 816 corresponding to the similar vectors.

The tags 812, 816 can provide additional description of movies that the user may be interested in, such as "science fiction" and "thriller." The user can simply click on the tags 812, 816 without needing to type anything into the cumbersome interface. By selecting one of the provided tags, the user can, with a single click, search the database for movies related to the selected tag.

Figure 9:
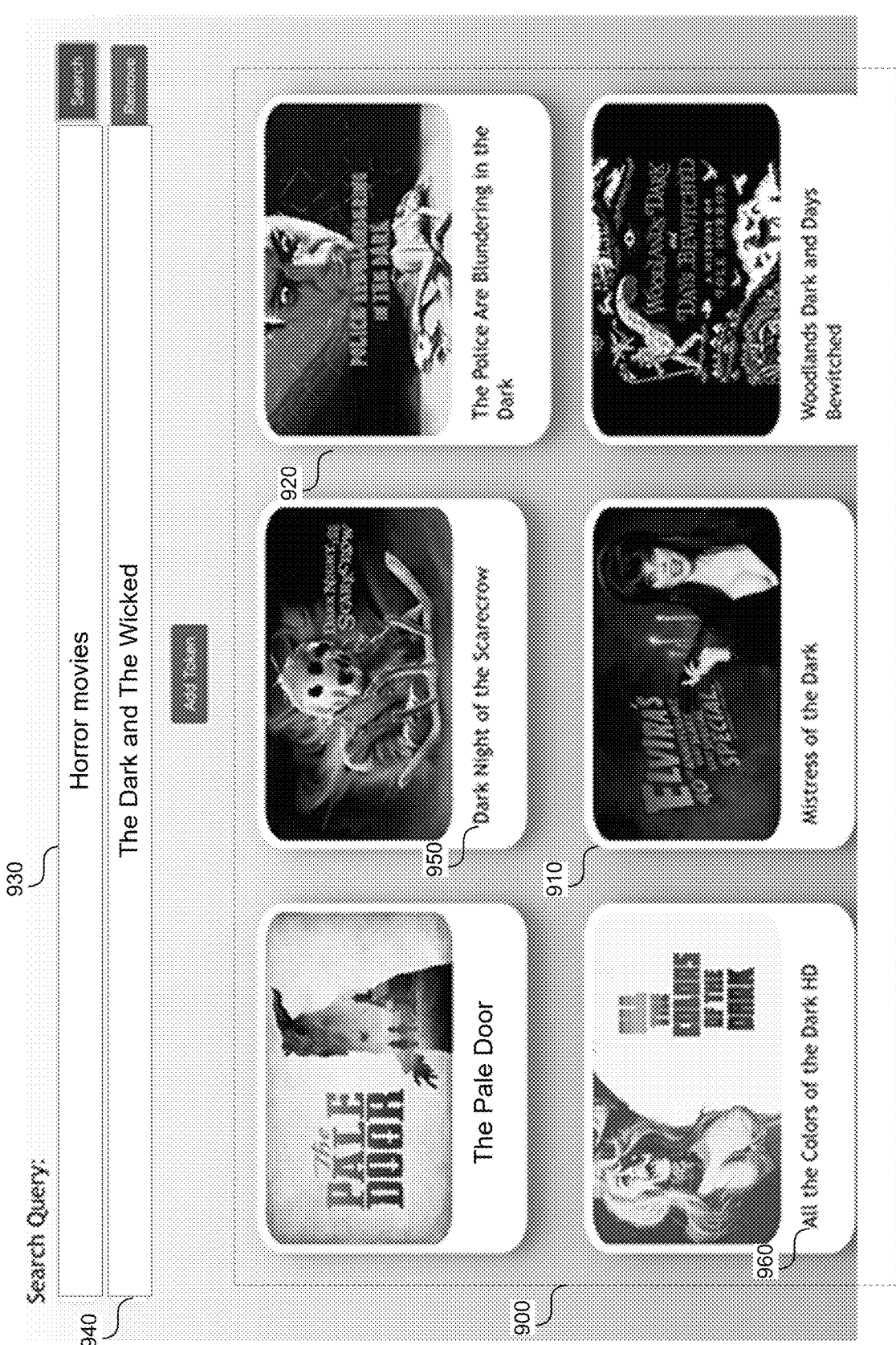
FIG. 9 shows an automatically generated ribbon of movie tiles.

FIG. 9 shows an automatically generated ribbon of movie tiles. In traditional streaming systems, the ribbon 900 containing movie tiles 910, 920 (only two labeled for brevity) is generated by curators who have more robust access to the system described in this application, and who can easily use typing to interface with the system. For example, the curators can generate the ribbons for action movies, comedy movies, or dramas, but if the user is interested in horror movies, there is no ribbon that the user can see.

The disclosed system enables the user to enter a natural language input 930, e.g., natural language query, describing the movie. In addition, through input 940, the user can indicate which movies to remove from the ribbon 900. The natural language input 930 can be text, or audio. The user can be a curator, or an end user with a cumbersome interface to the system.

The system can perform the semantic search in multidimensional space, as described in this disclosure, to find the relevant movies 950, 960 (only two labeled for brevity). The system can automatically generate the ribbon 900 and tiles 910, 920 based on the relevant movies 950, 960.

FIG. 10 is a flowchart of a method to proactively suggest videos to a user. A hardware or software processor executing instructions described in this application can, in step 1000, obtain a user profile associated with a database storing multiple digital media. The user profile can include an indication of a digital medium for which the user viewed a short description, a digital medium of which the user consumed a portion, and a digital medium which the user viewed from beginning to end. The database can store live television, a streaming digital medium, a transactional digital medium on demand, and a subscription digital medium on demand.

In step 1010, the processor can obtain a first tag describing the digital medium for which the user viewed the short description, a second tag describing the digital medium of which the user consumed the portion, and a third tag describing the digital medium which the user viewed from beginning to end.

In step 1020, the processor can obtain multiple tags associated with the multiple digital media stored in the database.

In step 1030, the processor can determine, among the multiple tags, a subset of tags similar to at least one of the first tag, the second tag, or the third tag by performing the following steps. First, the processor can use an artificial intelligence to convert the first tag, the second tag, and the third tag into a first vector in a multidimensional space, a second vector in the multidimensional space, and a third vector in the multidimensional space, respectively. Second, the processor can use the artificial intelligence to convert the multiple tags into multiple vectors in the multidimensional space. Third, the processor can determine multiple distances between the multiple vectors and the first vector, the second vector, and the third vector. Fourth, the processor can determine, among the multiple distances, a subset of distances satisfying a distance threshold. Fifth, based on the subset of distances, the processor can obtain the subset of tags similar to at least one of the first tag, the second tag, or the third tag, where a tag among the subset of tags corresponds to a distance among the subset of distances.

In step 1040, the processor can provide the subset of tags to the user, without the user typing to request the subset of tags.

The processor can receive a natural language input from the user, where the natural language input indicates a digital medium the user desires. Based on the natural language input, the processor can determine a first multiplicity of digital media corresponding to the natural language input. The processor can automatically generate a ribbon including multiple tiles, where each tile in the ribbon indicates a digital medium among the first multiplicity of digital media.

The processor can extract, from a first digital medium, an audio and a closed caption data. The processor can provide the audio, the closed caption data, and a prompt to a large language model. The prompt can request multiple tags based on the audio, the closed caption data, and the title associated with the digital medium. A tag among the multiple tags can include a natural language text indicating a property associated with the digital medium. The processor can store the multiple tags in the database by adding the multiple tags to the metadata associated with the digital medium to obtain new metadata.

The processor can obtain a history of user actions performed after a search result was provided to the user, where the search result included the digital medium, and where each user action in the history of user actions indicated a user interest in the digital medium. The user action can include looking at the detailed description of the digital medium, or watching at least a portion of the digital medium. The processor can obtain a history of search queries corresponding to the history of user actions. The processor can determine a similarity between the history of search queries and the multiple tags. The processor can rank the multiple tags based on the similarity to obtain a ranking. The processor can discard lower-ranked tags from the ranking to obtain a subset of the multiple tags. The processor can store the subset of the multiple tags in the database by adding the multiple tags to the metadata associated with the digital medium to obtain the new metadata.

The processor can obtain multiple social media tags associated with the digital medium. The processor can provide the multiple social media tags, the audio, the closed caption data, the title associated with the digital medium, and the prompt to a large language model to obtain the multiple tags.

Figure 11:
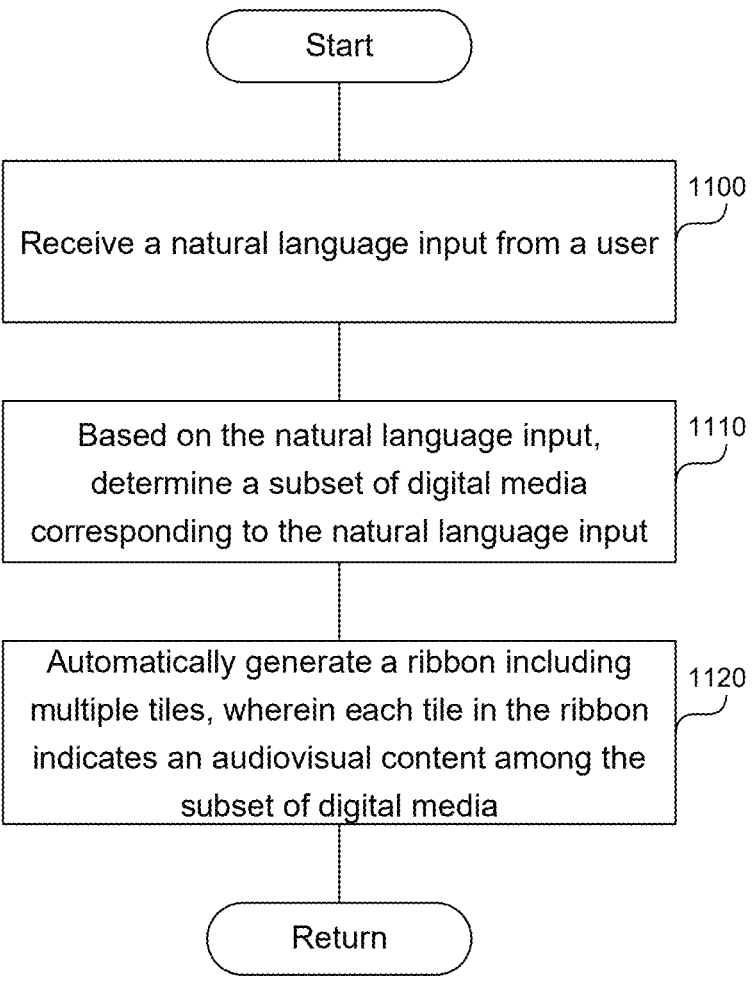
FIG. 11 is a flowchart of a method to automatically generate the ribbon indicating movies of interest to a user.

FIG. 11 is a flowchart of a method to automatically generate the ribbon indicating movies of interest to a user. A hardware or software processor implementing instructions described in this application can, in step 1100, receive a natural language input from a user. The user can be a curator that can efficiently interact with the system by typing, or a user that has a limited functionality keyboard, or no keyboard at all. The natural language input can be typed text, or audio indicating a digital medium, e.g., a movie, the user desires.

In step 1110, based on the natural language input, the processor can determine a subset of digital media corresponding to the natural language input by performing the following four steps.

In step 1, the processor can obtain, from a database, multiple digital media and multiple metadata associated with the multiple digital media. A digital medium among the multiple digital media can include a metadata among the multiple metadata. The metadata among the multiple metadata can include multiple tags generated by a large language model to describe the digital medium.

In step 2, the processor can perform the following substep for each digital medium among the multiple digital media to obtain multiple multidimensional vectors. Specifically, the processor can convert the metadata into a single first multidimensional vector in a multidimensional space. The first multidimensional vector can encode information included in the multiple tags as a numerical representation in the multidimensional space. A distance between the first multidimensional vector and a second multidimensional vector in the multidimensional space indicates similarity between the metadata associated with the first multidimensional vector and a second metadata represented by the second multidimensional vector. For example, a distance of zero indicates identity, while increasing distance indicates increasing dissimilarity.

In step 3, the processor can convert the natural language query into a third multidimensional vector in the multidimensional space.

In step 4, the processor can determine, among the multiple multidimensional vectors, a subset of multidimensional vectors satisfying a distance threshold to the third multidimensional vector. The distance threshold can indicate a predetermined distance, or the top 10 closest vectors. The subset of multidimensional vectors can correspond to the subset of digital media among the multiple digital media.

In step 1120, the processor can automatically generate a ribbon including multiple tiles, wherein each tile in the ribbon indicates a digital medium among the subset of digital media.

Computer System

Figure 12:
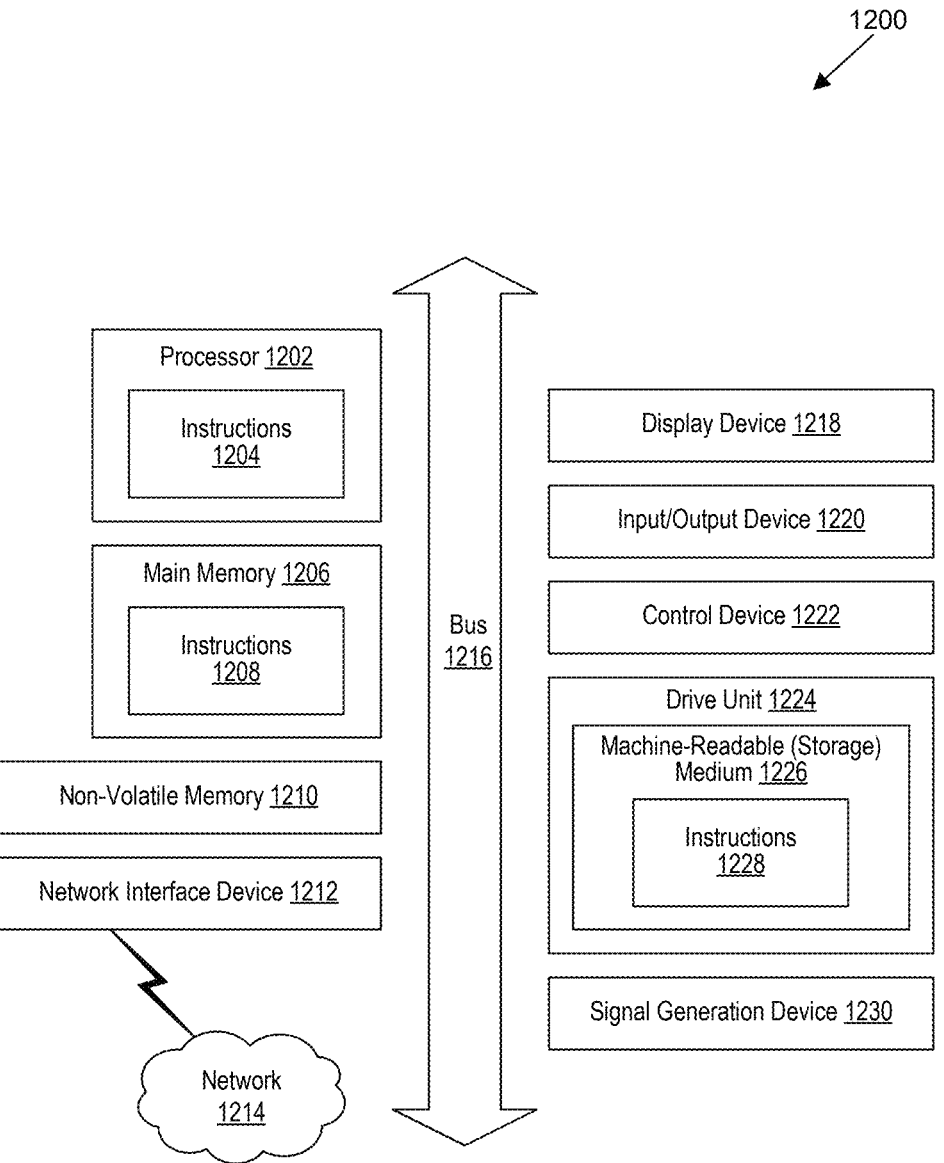
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), augmented reality (AR)/virtual reality (VR) systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks.

Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.
Remarks The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

obtain, from a database, multiple video data and multiple metadata associated with the multiple video data,
wherein a video data among the multiple video data includes a metadata among the multiple metadata,
wherein the video data is associated with a video,
wherein the metadata among the multiple metadata includes multiple tags generated by a large language model to describe the video and a transcript associated with the video;

enable a semantic search of the multiple video data to obtain multiple multidimensional vectors by performing steps for each video data among the multiple video data comprising:
combining and converting the multiple tags and the transcript associated with the video into a first multidimensional vector in a multidimensional space,
wherein the first multidimensional vector encodes information included in the multiple tags and the transcript associated with the video as a numerical representation in the multidimensional space,
wherein a distance between the first multidimensional vector and a second multidimensional vector in the multidimensional space indicates similarity between the metadata associated with the first multidimensional vector and a second metadata represented by the second multidimensional vector;

store the first multidimensional vector in the database,
wherein the first multidimensional vector corresponds to the each video data stored in the database;

obtain a natural language query associated with the database;

convert the natural language query into a third multidimensional vector in the multidimensional space;

perform the semantic search of the multiple video data by obtaining, among the multiple multidimensional vectors, a subset of multidimensional vectors satisfying a distance threshold to the third multidimensional vector,
wherein the subset of multidimensional vectors corresponds to a subset of video data among the multiple video data; and present the subset of video data as a result to the natural language query.

2. The non-transitory, computer-readable storage medium of claim 1, comprising instructions to:

obtain, from the database storing the multiple video data, the metadata associated with the video data,
wherein the metadata includes at least three of: a title associated with the video data, a subtitle associated with the video data, a description associated with the video data, a genre associated with the video data, or a performer associated with the video data;

extract, from the video, an audio and a closed caption data;

provide the audio, the closed caption data, a prompt, and the metadata to the large language model,
wherein the prompt requests the multiple tags based on the audio, the closed caption data, and the video,
wherein a tag among the multiple tags includes a natural language text indicating a property associated with the video; and store the multiple tags in the database by adding the multiple tags to the metadata associated with the video.

3. The non-transitory, computer-readable storage medium of claim 1, comprising instructions to:

determine multiple distances between each multidimensional vector among the multiple multidimensional vectors and the third multidimensional vector using a cosine similarity between each multidimensional vector among the multiple multidimensional vectors and the third multidimensional vector.

4. The non-transitory, computer-readable storage medium of claim 1, comprising instructions to:

extract, from the video, an audio and a closed caption data;

provide the audio, the closed caption data, a prompt, and the video to the large language model,
wherein the prompt requests the multiple tags based on the audio, the closed caption data, and the video,
wherein a tag among the multiple tags includes a natural language text indicating a property associated with the video; and store the multiple tags in the database by adding the multiple tags to the metadata associated with the video.

5. The non-transitory, computer-readable storage medium of claim 1, comprising instructions to:

determine multiple distances between each multidimensional vector among the multiple multidimensional vectors and the third multidimensional vector using a cosine similarity between each multidimensional vector among the multiple multidimensional vectors and the third multidimensional vector; and rank the multiple multidimensional vectors using the multiple distances.

6. The non-transitory, computer-readable storage medium of claim 1, comprising instructions to:

obtain a social media tag associated with the video;

extract, from the video, an audio and a closed caption data;

provide the audio, the closed caption data, the social media tag, and a prompt to the large language model,
wherein the prompt requests the multiple tags based on the audio, the closed caption data, and the video, wherein a tag among the multiple tags includes a natural language text indicating a property associated with the video; and store the multiple tags in the database by adding the multiple tags to the metadata associated with the video.

7. The non-transitory, computer-readable storage medium of claim 1, comprising the database storing live television, streaming video content, transactional video on demand, and subscription video on demand.

8. A method comprising:

obtaining, from a database, multiple digital media and multiple metadata associated with the multiple digital media, wherein a digital medium among the multiple digital media includes a metadata among the multiple metadata, wherein the metadata among the multiple metadata includes multiple tags generated by a large language model to describe the digital medium and a transcript associated with the digital medium;

enabling a semantic search of the multiple digital media to obtain multiple multidimensional vectors by:

combining and converting the multiple tags and the transcript associated with the digital medium into a first multidimensional vector in a multidimensional space, wherein the first multidimensional vector encodes information included in the multiple tags and the transcript associated with the digital medium as a numerical representation in the multidimensional space, wherein a distance between the first multidimensional vector and a second multidimensional vector in the multidimensional space indicates similarity between the metadata associated with the first multidimensional vector and a second metadata represented by the second multidimensional vector;

obtaining a natural language query associated with the database;

converting the natural language query into a third multidimensional vector in the multidimensional space;

perform the semantic search of the multiple digital media by:

determining whether the first multidimensional vector satisfies a distance threshold to the third multidimensional vector; and upon determining that the first multidimensional vector satisfies the distance threshold, presenting the digital medium as a result to the natural language query.

9. The method of claim 8, comprising:

obtaining, from the database storing the multiple digital media, the metadata associated with the digital medium, wherein the metadata includes at least three of: a title associated with the digital medium, a subtitle associated with the digital medium, a description associated with the digital medium, a genre associated with the digital medium, or a performer associated with the digital medium;

extracting, from the digital medium, an audio and a closed caption data;

providing the audio, the closed caption data, a prompt, and the metadata to the large language model, wherein the prompt requests the multiple tags based on the audio, the closed caption data, and the digital medium, wherein a tag among the multiple tags includes a natural language text indicating a property associated with the digital medium; and storing the multiple tags in the database by adding the multiple tags to the metadata associated with the digital medium.

10. The method of claim 8, comprising:

determining a distance between the first multidimensional vector and the third multidimensional vector using a cosine similarity.

11. The method of claim 8, comprising:

extracting, from the digital medium, an audio and a closed caption data;

providing the audio, the closed caption data, a prompt, and the digital medium to the large language model, wherein the prompt requests the multiple tags based on the audio, the closed caption data, and the digital medium, wherein a tag among the multiple tags includes a natural language text indicating a property associated with the digital medium; and storing the multiple tags in the database by adding the multiple tags to the metadata associated with the digital medium.

12. The method of claim 8, comprising:

obtaining a user profile associated with a database storing multiple digital media, wherein the user profile includes an indication of a digital medium for which a user viewed a short description, a digital medium of which the user viewed a portion, and a digital medium which the user viewed from beginning to end; and encoding the user profile and the natural language query into the third multidimensional vector.

13. The method of claim 8, comprising:

obtaining a social media tag associated with the digital medium;

extracting, from the digital medium, an audio and a closed caption data;

providing the audio, the closed caption data, the social media tag, and a prompt to the large language model, wherein the prompt requests the multiple tags based on the audio, the closed caption data, and the digital medium, wherein a tag among the multiple tags includes a natural language text indicating a property associated with the digital medium; and storing the multiple tags in the database by adding the multiple tags to the metadata associated with the digital medium.

14. The method of claim 8, comprising the database storing live television, a streaming digital medium, a transactional digital medium on demand, and a subscription digital medium on demand.

15. A system comprising:

at least one hardware processor; and at least one non-transitory memory storing instructions, which, when executed by the at least one hardware processor, cause the system to:

obtain, from a database, multiple digital media and multiple metadata associated with the multiple digital media, wherein a digital medium among the multiple digital media includes a metadata among the multiple metadata, wherein the metadata among the multiple metadata includes multiple tags generated by a large language model to describe the digital medium and a transcript associated with the digital medium;

enable a semantic search of the multiple digital media to obtain multiple multidimensional vectors by:

combining and converting the multiple tags and the transcript associated with the digital medium into a first multidimensional vector in a multidimensional space, wherein the first multidimensional vector encodes information included in the multiple tags and the transcript associated with the digital medium as a numerical representation in the multidimensional space, wherein a distance between the first multidimensional vector and a second multidimensional vector in the multidimensional space indicates similarity between the metadata associated with the first multidimensional vector and a second metadata represented by the second multidimensional vector;

obtain a natural language query associated with the database;

convert the natural language query into a third multidimensional vector in the multidimensional space;

perform the semantic search of the multiple digital media by:

determining whether the first multidimensional vector satisfies a distance threshold to the third multidimensional vector; and upon determining that the first multidimensional vector satisfies the distance threshold, presenting the digital medium as a result to the natural language query.

16. The system of claim 15, comprising instructions to:

obtain, from the database storing the multiple digital media, the metadata associated with the digital medium, wherein the metadata includes at least three of: a title associated with the digital medium, a subtitle associated with the digital medium, a description associated with the digital medium, a genre associated with the digital medium, or a performer associated with the digital medium;

extract, from the digital medium, an audio and a closed caption data;

provide the audio, the closed caption data, a prompt, and the metadata to the large language model, wherein the prompt requests the multiple tags based on the audio, the closed caption data, and the digital medium, wherein a tag among the multiple tags includes a natural language text indicating a property associated with the digital medium; and store the multiple tags in the database by adding the multiple tags to the metadata associated with the digital medium.

17. The system of claim 15, comprising instructions to:

determine a distance between the first multidimensional vector and the third multidimensional vector using a cosine similarity.

18. The system of claim 15, comprising instructions to:

extract, from the digital medium, an audio and a closed caption data;

provide the audio, the closed caption data, a prompt, and the digital medium to the large language model, wherein the prompt requests the multiple tags based on the audio, the closed caption data, and the digital medium, wherein a tag among the multiple tags includes a natural language text indicating a property associated with the digital medium; and store the multiple tags in the database by adding the multiple tags to the metadata associated with the digital medium.

19. The system of claim 15, comprising instructions to:

obtain a social media tag associated with the digital medium;

extract, from the digital medium, an audio and a closed caption data;

provide the audio, the closed caption data, the social media tag, and a prompt to the large language model, wherein the prompt requests the multiple tags based on the audio, the closed caption data, and the digital medium, wherein a tag among the multiple tags includes a natural language text indicating a property associated with the digital medium; and store the multiple tags in the database by adding the multiple tags to the metadata associated with the digital medium.

20. The system of claim 15, comprising the database storing live television, a streaming digital medium, a transactional digital medium on demand, and a subscription digital medium on demand.

\* \* \* \* \*